United States Patent
Westrelin

(10) Patent No.: US 7,234,006 B2
(45) Date of Patent: Jun. 19, 2007

(54) GENERALIZED ADDRESSING SCHEME FOR REMOTE DIRECT MEMORY ACCESS ENABLED DEVICES

(75) Inventor: Roland Westrelin, Grenoble (FR)

(73) Assignee: Sun Microsystems, Inc., Santa Clara, CA (US)

( * ) Notice: Subject to any disclaimer, the term of this patent is extended or adjusted under 35 U.S.C. 154(b) by 409 days.

(21) Appl. No.: 10/858,128

(22) Filed: Jun. 1, 2004

(65) Prior Publication Data

US 2005/0097183 A1   May 5, 2005

(30) Foreign Application Priority Data

Nov. 3, 2003    (EP)    ................... 03292736

(51) Int. Cl.
*G06F 3/00* (2006.01)
*H04L 29/06* (2006.01)

(52) U.S. Cl. ................. 710/22; 710/2; 710/3; 709/203; 709/212; 709/223; 370/400; 370/428; 370/466

(58) Field of Classification Search ................. 710/22, 710/2, 3; 370/466, 428, 400; 709/203, 212, 709/223
See application file for complete search history.

(56) References Cited

U.S. PATENT DOCUMENTS

| | | | |
|---|---|---|---|
| 6,163,834 A | 12/2000 | Garcia et al. | ................ 711/206 |
| 6,598,144 B1 | 7/2003 | Bailey et al. | ................ 711/203 |
| 6,983,303 B2 * | 1/2006 | Pellegrino et al. | .......... 709/203 |
| 2002/0062402 A1 | 5/2002 | Regnier et al. | ............. 709/313 |
| 2003/0135685 A1 | 7/2003 | Cowan | ........................ 710/308 |
| 2004/0190533 A1 * | 9/2004 | Modi et al. | .................. 370/400 |
| 2004/0225719 A1 * | 11/2004 | Kisley et al. | ................ 709/212 |

OTHER PUBLICATIONS

Recio, R. "RDMA enabledNIC (RNIC) Verbs Overview," pp. 1-28, dated Apr. 29, 2003. Available from□□http://www.rdmaconsortium.org/home/RNIC Verbs_Overview2.pdf.*
European Search Report dated May 14, 2004 (3 pgs.).

* cited by examiner

*Primary Examiner*—Tammara Peyton
(74) *Attorney, Agent, or Firm*—Osha Liang LLP

(57) ABSTRACT

An apparatus accesses a resource in a computer system. The resource is accessible at a physical memory address (49) of the computer system. The apparatus comprises means for determining at least one identity parameter for the resource and means for storing a translation (261.1, 26.2, ..., 26.n) between the at least one identity parameter and the physical memory address (49) in a network interface table (26). The network interface table (26) is accessible by a Remote Direct Memory Access enabled network interface (48) of the computer system.

17 Claims, 4 Drawing Sheets

GENERALIZED ADDRESSING SCHEME FOR REMOTE DIRECT MEMORY ACCESS ENABLED DEVICES

This application claims the benefit, pursuant to 35 U.S.C. §119, of European Patent Application No. 03292736.0 filed on Nov. 3, 2003 with the European Patent Office.

BACKGROUND OF INVENTION

1. Field of the Invention

The invention relates generally to an addressing scheme for addressing resources in a computer system.

2. Background Art

Most of today's computer systems may include a client using at least one remotely accessible resource. For example, the remotely accessible resource may be data stored in a computer memory or data stored on a mass storage device. The remotely accessible resource may be located within a computer system together with the client or in a remote computer system connected to a client computer system through a network.

Computer systems generally experience a gain in overall performance as CPU data handling capacities and communication bandwidth within a computer system or between computer systems (connected through a network) are increased and memory access times are reduced. A few years ago, the traffic on the communication bandwidth would allow data transfer rates that could be easily handled by a computer system's CPU without impeding on general performance of the computer system. Today, the available communication bandwidth is reaching values where processing incoming and outgoing data may use excessive amounts of CPU processing time. Consequently, a once relatively large communication bandwidth may be reduced de facto from a bottleneck condition when communicated data is processed by the CPUs of remote computer systems.

In traditional hardware and software architecture, a significant load is imposed on a server's CPU and memory because data is often copied between a network subsystem of a kernel of the computer system and an application executed on the computer system. Various solutions have been developed to avoid or at least reduce the described bottleneck effect. One solution is known as Remote Direct Memory Access ("RDMA"). RDMA is a network interface ("NI") feature that allows one computer system to directly place information into the memory of another computer. RDMA minimizes demands on bandwidth and processing overhead.

RDMA is widely used to read or write data in a computer system's memory. A RDMA write request allows the copying of data directly into a physical memory used by an application on a remote computer system. The RDMA write request therefore includes an address at which the data should be copied. A RDMA read request allows the reading of data directly from the physical memory of a remote computer system and copying the data into the memory of the requesting computer system. The RDMA read request includes two addresses: source of data and destination of data.

To make memory available for writing or reading data, the RDMA-enabled remote computer system publishes a process identity and a virtual address of the available memory for use by other computer systems. Any other computer system may use the process identity and the virtual address of the available memory in a RDMA request directed to the remote computer system. The process identity and the virtual address are recognized by the remote system and access to the corresponding memory for writing and/or reading is immediately enabled.

A RDMA write or read request usually submits the process identity together with a virtual address to the network interface of the remote computer system. The network interface has access to a shared translation table that is maintained by the kernel of the system. The shared translation table identifies a link between the couple comprising a process identity and a virtual address, and a corresponding physical address in the computer system.

While the virtual address for a memory location remains constant, the physical address of the storage location may vary in time depending on various factors, such as how the data stored at the virtual address is used in the computer system. Specifically, the data may be moved from one physical location in memory to another. In this case, the kernel updates the link corresponding to the virtual address in the shared translation table with the address of the other physical location.

Similarly, each client computer issuing a RDMA write and/or RDMA read request(s) may also include a RDMA-enabled network interface and a shared translation table. In fact, each computer system containing a RDMA-enabled network interface may potentially act as a client or as a server during a RDMA operation.

Accessing certain resources in a remote computer system may continue to involve manipulation of data by the host CPU of the remote computer system. For example, manipulation may be required for resources that are made accessible through a cache memory system, such as cached hard disks, when a cache system may not cooperate with a RDMA functionality of the NI.

SUMMARY OF INVENTION

In a first aspect the invention provides a method for accessing a resource in a computer system. The resource is accessible at a physical memory address of the computer system. The method comprise determining at least one identity parameter for the resource, can storing a translation between the at least one identity parameter and the physical memory address in a netsork interface table, wherein the network interface table is accessible by a Remote direct Memory Access enabled network interface of the computer system.

In a first preferred embodiment the method for accessing a resource in a computer system further comprises computing the at least one identity parameter into a virtual address for the resource, and translating the virtual address for the resource into the physical memory address.

In a second preferred embodiment, the method for accessing a resource in a computer system further comprises computing a unique a unique identifier from the at least one identity parameter, and storing a translation between the unique identifier and the physical memory address corresponding to the at least one identity parameter in the network interface table.

In a third preferred embodiment the method for accessing a resource in a computer system, the resource is a block of data stored on a mass storage device connected to the computer system. The at least one identity parameter comprises a mass storage device identity and an offset for the block of data on the mass storage device. The translating of the at least one identity parameter into a virtual address extracts data from a mass storage cache index. The translating of the virtual address into the physical address extracts data from a page table.

In a fourth preferred embodiment the method for accessing a resource in a computer system further comprises processing a Remote direct Access request at the network interface and extracting information corresponding to the at least one identity parameter from the Remote Direct Memory Access request. The extracted at least one identity parameter is translated into the corresponding physical memory address using the network interface table, and the resource is accessed at the physical memory through the network interface.

In a fifth preferred embodiment the mass storage device is a hard disk and the mass storage device cache index is a hard disk cache index.

In a sixth preferred embodiment the network interface comprises translation information referring to data blocks stored outside of a hard disk cache.

In a second aspect, the invention provides a network interface table for use in a Remote Direct Memory Access enabled network interface of a computer system. The network interface table comprises at least one identity parameter identifying a mass storage device of the computer system and an offset value for a block of data stored on the mass storage device. The identity parameter is stored in the network interface table together with a physical memory address of the computer system at which the block of data is stored.

In a third aspect the invention provides a computer system for accessing a resource. The computer system comprises a network interface table accessible by a Remote Direct Memory Access enabled network interface, and at least one identity parameter of a resource stored in the network interface table. The computer system further comprises a physical memory address at which the resource is stored. A translation between the at least one identity parameter and the physical memory address is stored in the network interface table.

In a fourth aspect the invention provides an apparatus for accessing a resource in a computer system. The resource is accessible at a physical memory address of the computer system. The apparatus comprises means for determining at least one identity parameter for the resource, and means for storing a translation between the at least one identity parameter and the physical memory address in a network interface table, wherein the network interface table is accessible by a Remote Direct Memory Access enabled network interface of the computer system.

Other aspects and advantages of the invention will be apparent from the following description and the appended claims.

DETAILED DESCRIPTION

Figure 1:
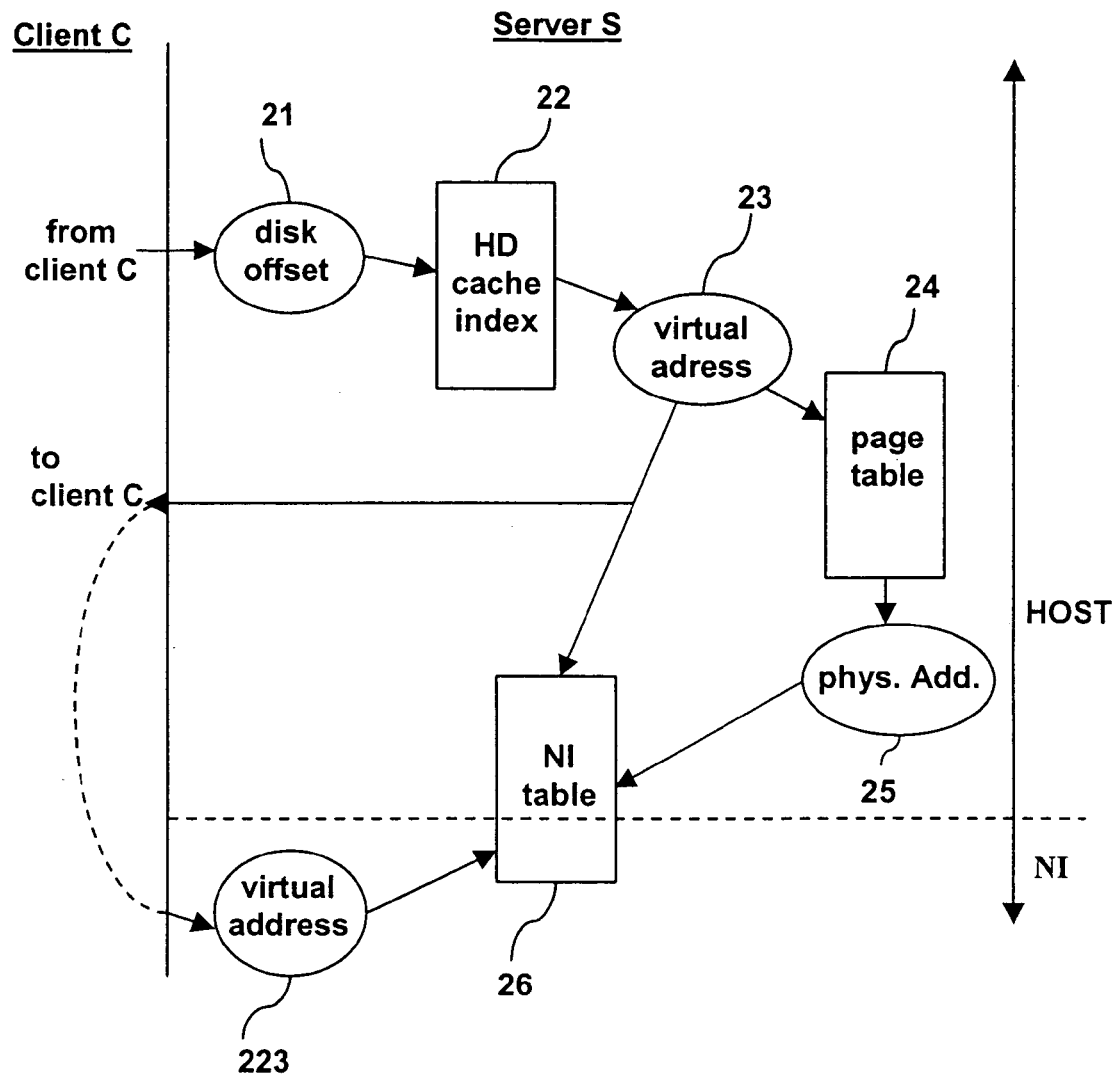
FIG. 1 illustrates steps of an addressing scheme.

Specific embodiments of the invention will now be described in detail with reference to the accompanying figures. Like elements in the various figures are denoted by like reference numerals for consistency.

In the following detailed description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIG. 1 illustrates steps involved in the prior art translation of addresses that occur in the server S. In this example, a typical prior art addressing scheme is described in which a client C sends a request to read a block of data from a hard disk located on a server S. Assume, for the purposes of this example, that the requested block of data is in the hard disk cache of the server S, i.e., in a kernel-level resource cache. Further, note that the typical scheme involves the intervention of the host CPU of the server S.

As shown, the host CPU of server S receives a message 21 requesting the block of data from a host CPU of the client C. The block of data is identified using a hard disk identifier and an offset of the block of data on the hard disk. The host CPU of the server S is generally interrupted on receipt of the message 21, and a context switch occurs.

Next, the host CPU of the server S checks in a hard disk cache index 22 to find the hard disk identifier and the offset of the block of data. Because the block of data is stored in the hard disk cache, the host CPU of the server S finds the hard disk identifier and the offset of the block of data, and obtains a virtual address 23 of the block of data. The virtual address 23 of the block of data indicates a location of the block of data in the hard disk cache.

The host CPU of the server S performs a look up of a page table 24 to obtain a translation of the virtual address 23 into a physical address 25. The physical address 25 indicates a location of the block of data in physical memory of the server S (not shown).

In a next step, the host CPU of the server S registers the hard disk cache storing the block of data in a network interface table ("NIT") 26, by storing the translation between the virtual address 23 and the obtained physical address-25 in the NIT 26.

The host CPU of the server S responds to the request from the host CPU of the client C by sending the virtual address 23 of the requested block of data to the client C. The steps performed in the server S when receiving the request from the client C include checking the hard disk cache index 22, looking up the page table 24, registering the concerned hard disk cache in the NIT 26, and sending the virtual address 23 to the client C. Each of these steps require processing time from the host CPU of the server S. These steps illustrate the upper part of FIG. 1 that is labeled "host."

Once the block of data is stored, the following steps allow access to the block of data during a typical RDMA operation. The client C initiates a RDMA read operation to obtain the block of data by sending a RDMA read request 223 containing the virtual address, previously received from the Server S, to the NI of the server S. In accordance with conventional RDMA operation, the NI of the server S uses the virtual address to perform a look up in the NIT 26 and identify the physical address 25 at which the block of data may be read in the physical memory of the server S.

Subsequent steps of reading the block of data and transmitting the read block of data to the client C are conventional RDMA steps.

As is known from RDMA operations, the steps of receiving the virtual address and identifying the physical address 25 in the NIT 26 by the NI does not require any processing from the host CPU of the server S.

Once the RDMA read operation is completed, the client C notifies the server S that the block of data stored in the hard disk cache is not in use for copy anymore. As a result, the server S may decide to make changes in the hard disk cache that affect the block of data, e.g., the server S may decide to delete the block of data from the hard disk cache if the block of data is no longer needed.

General Overview of the Invention

Figure 2:
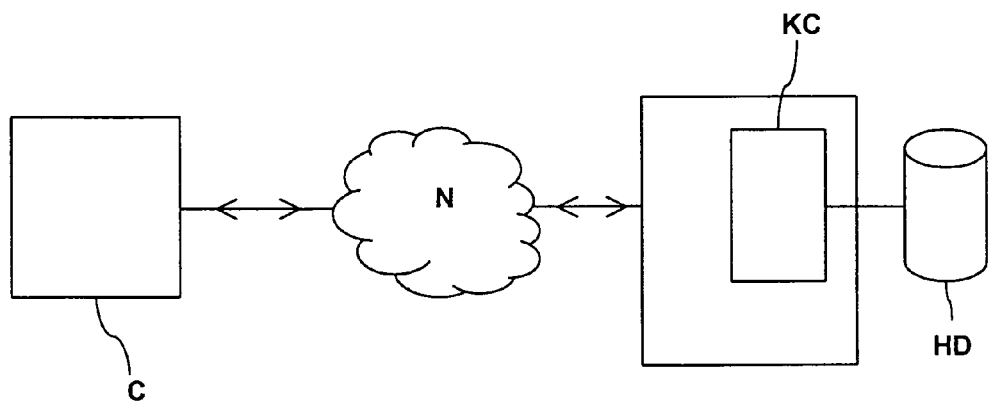
FIG. 2 schematically illustrates a network system.

An exemplary embodiment of the invention may take advantage of a kernel-level resource cache (e.g., mass storage device cache, such as a hard drive device cache etc.) on a server S, including a resource of a network system (e.g., a block of data stored on mass storage device, such as data on a hard disk, etc.). FIG. 2 schematically illustrates a typical network system N through which a client computer system C connects to a server computer system S. The server S includes a hard disk HD and a kernel-level resource cache KC that is used for caching data from the hard disk HD in a manner well known in the art.

Operation of the exemplary embodiment (not illustrated in FIG. 2) is described below. If (i) data requested by a client corresponds to data stored on the hard disk; and (ii) the data requested is stored in the hard disk cache of the server S, then communications may take place to and/or from the hard disk cache using RDMA, i.e., using a NI of the server S.

In an embodiment of the invention, the hard disk cache buffer is explicitly registered to be used for a RDMA read or write. Specifically, in RDMA-capable network technologies, only buffers that are explicitly registered are used for RDMA reads and writes. Thus, after being registered, a buffer becomes DMA-enabled and can be accessed from the NI.

An application in the server is typically dedicated to rendering a hard disk cache buffer DMA-enabled. The application registers its memory for communication, i.e., the application registers identity parameters for a particular resource of a computer system to be at least partially entered in a NIT by issuing a system call to the kernel of a system. An example of an identity parameter is hard disk cache information (i.e., a hard disk identifier and an offset of data on hard disk). A kernel portion of a communication subsystem in the computer system determines the appropriate physical addresses corresponding to the hard disk cache information, and records a translation between the hard disk cache information (including the disk identifier and offset), and the corresponding physical address. The translation is recorded in the NIT.

When the NI needs to perform a RDMA on a memory area to access cached hard disk information, the NI translates the hard disk cache information (including the disk identifier and offset) into a physical address. For this purpose, the NI fetches the translation in the NIT.

An Embodiment for Addressing Remote Cached Disk Data

An embodiment of the present invention relates to a client C sending a request to read for a block of data to the server S. The block of data is stored on a hard disk of the server S and may be identified using a hard disk identifier and an offset of the block of data on the hard disk. The server S uses a hard disk cache to store data from the hard disk into physical memory, in particular when data from the hard disk is frequently accessed. It is again assumed that the block of data is located in the hard disk cache memory, i.e., stored into physical memory.

In one embodiment of the present invention, physical addresses corresponding to the block of data stored in the hard disk cache are stored in a NIT together with a unique identifier. The unique identifier uniquely corresponds to the hard disk identifier and the offset of the block of data on the hard disk.

More precisely, virtual addressing information of data blocks listed in the hard disk cache index of the server S may be processed at any time to create entries in the NIT. Each entry in the NIT allows translation of an identifier corresponding to a hard disk identifier and an offset of the data block into a physical address of each block of data stored in the hard disk cache. The entries in the NIT enable conventional RDMA reads and writes of each cached block of data from the hard disk of the server S by allowing virtual addressing.

Typically, the processing of the virtual address information and the creation of entries in the NIT occurs before a RDMA access for the concerned block of data occurs. Also, the processing of the virtual address information and the creation of entries in the NIT is typically done at a time where excess host CPU processing time becomes available in the server S.

Figure 3:
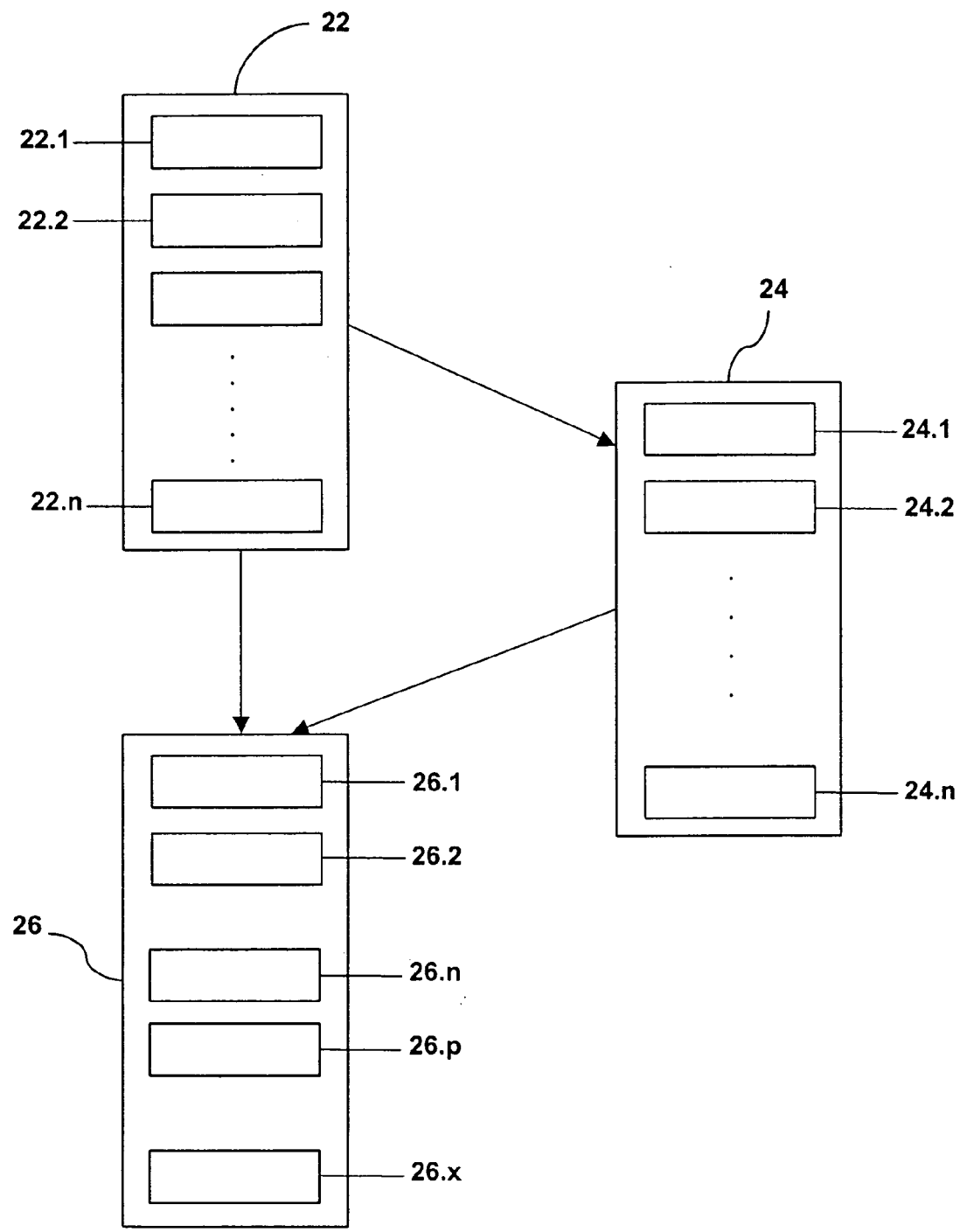
FIG. 3 illustrates an example of translations performed on addresses in accordance with an embodiment of the invention.

FIG. 3 illustrates steps of processing of virtual address information 22.1, 22.2, ... 22.n stored in the hard disk cache index 22 of the server S in accordance with one or more embodiments of the present invention. Each virtual address information entry 22.1, 22.2, ... 22.n corresponds to a data block and involves a translation between a hard disk cache information pair (including a disk identifier and an offset for the data block on the hard disk) and a virtual address of the data block in the hard disk cache.

The server S performs a look up in the page table 24 and identifies for each virtual address information entry 22.1, 22.2, ... 22.n a physical address 24.1, 24.2, ... 24.n of the corresponding block of data.

The server S further processes for each virtual address information 22.1, 22.2, ... 22.n the hard disk cache information pair (including a disk identifier and an offset for the data block on the hard disk) in order to obtain a unique identifier for the data block. For each data block, the server S stores the unique identifier and the corresponding physical address identified from 24.1, 24.2, ... 24.n into entries 26.1, 26.2, ... 26.n of the NIT 26.

In one embodiment of the invention, the NIT 26 may contain the disk identifier and the offset of the block of data for each block of data instead of the unique identifier. In this case, no unique identifier is computed.

The processing of virtual address information may not necessarily be performed on each item of the hard disk cache index 22 at the same time or in sequence. The processing may be performed for a limited number of items only, e.g., for one single item when this item is newly stored in the hard disk-cache index 22. Consequently, the steps of obtaining a corresponding physical address from the page table 24 and updating the NIT 26 are performed for the single item only.

Furthermore, the NIT 26 may contain other translation information 26.p, ... 26.q referring to data blocks that are stored outside of the hard disk cache. The other translation information 26.p, ... 26.q may be concerned with memory used by applications, which is well known in the prior art.

Figure 4:
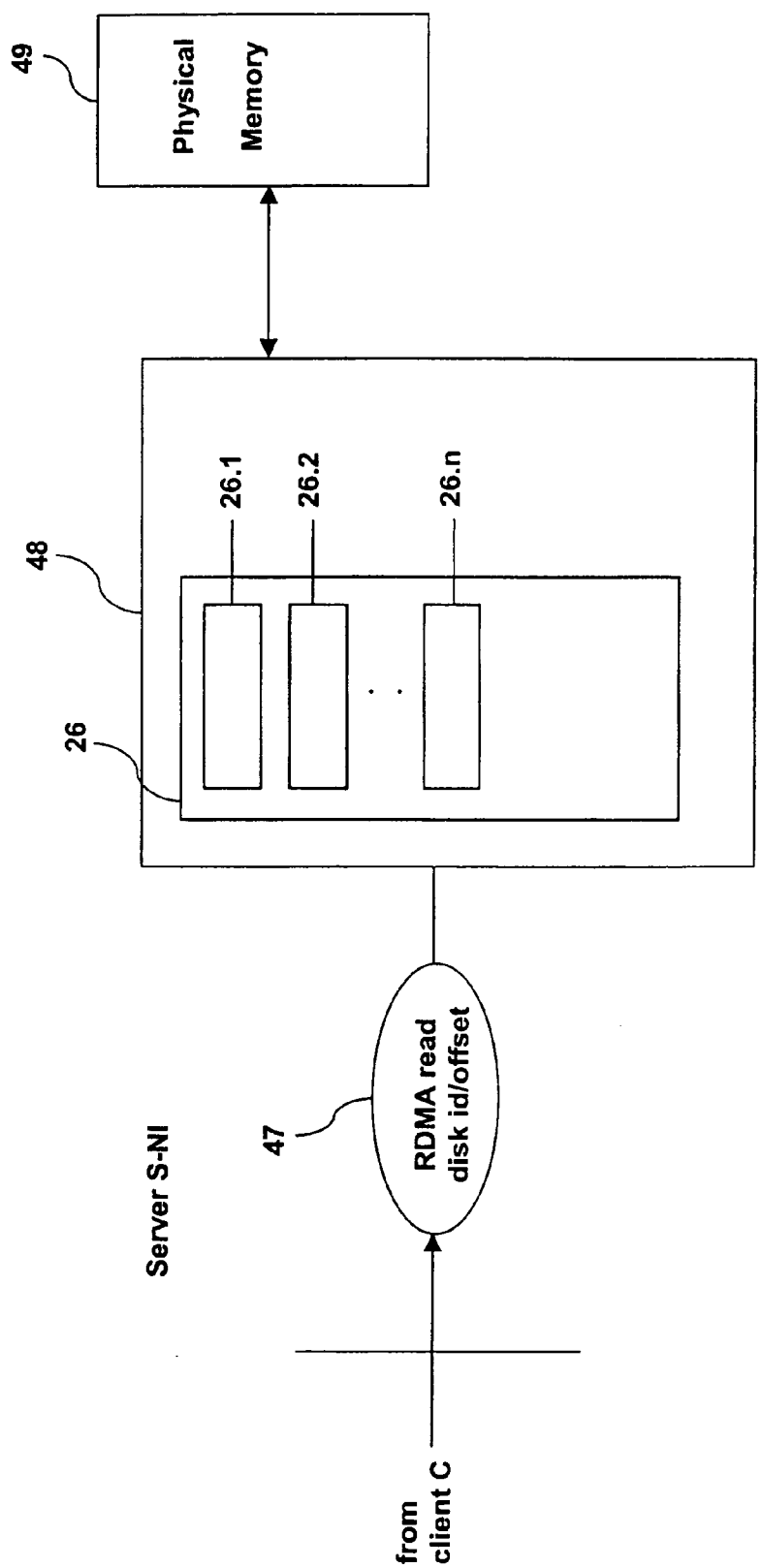
FIG. 4 illustrates a RDMA request received in a network interface in accordance with an embodiment of the invention.

FIG. 4 illustrates steps involved between the client C and the server S when a request to read a block of data is sent from the client C to the server S in accordance with one embodiment of the invention. The request is entirely handled over RDMA, i.e., no request is sent to the host CPU of the server S. The request to read a block of data is typically operated only at the level of the NI. Hence, the NI may be the only device of the server S controlling disk cache access for client requests.

As shown, the client C issues a RDMA read request 47 to the server S, i.e., the RDMA read request 47 is sent to the NI 48 of the server S. The RDMA read request includes the unique identifier of the block of data. In one embodiment of the invention, the RDMA request may contain the disk identifier and the offset on the disk for the requested block of data instead of the unique identifier.

The NI 48 processes the RDMA read request 47 and obtains from the NIT 26 the corresponding physical address of the block of data in the hard disk cache. The requested block of data is transmitted from physical memory 49 to the client C in a conventional manner for RDMA requests.

The NI 48 fully administers the status of the block of data and handles any operation concerning the status directly with the server S, as appropriate. As a result, the client C is not required to notify the server S about the status of the block of data for reading.

Embodiments of the present invention may have one or more of the following advantages. Only the NI resource is used when accessing data stored in the hard disk cache of the server S. No host CPU processing time of the server S is required resulting in a lower risk of reducing speed of data exchange with a client outside the server S caused by a bottleneck effect from the lack of host-CPU processing time in the server S.

Further, the amount of data exchanged between the client C and the server S for a request for a block of data is minimized. The amount of data exchange is minimized because the absence of messages addressed to the host CPU of the server S, e.g., the absence of the notification about the status of the block of data in the hard disk cache.

Further, the inventive addressing scheme may be implemented in existing RDMA-enabled systems with minimal modifications to existing network hardware or protocols. Modifications necessary are limited to implementing a scheme for managing the RDMA addresses.

Further, the addressing scheme may easily be transposed to other resources located in RDMA-enabled devices. For example, the addressing scheme may be transposed by attributing a specific identifier to a physical address of another resource (i.e., by allowing direct access to the other resource by the RDMA requester to be enabled). As a result, the RDMA request may be handled solely by the NI without involvement of the host CPU from the RDMA-enabled device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for accessing a resource in a computer system, the resource being accessible at a physical memory address of the computer system, the method comprising:
    determining at least one identity parameter for the resource;
    translating the at least one identity parameter into a virtual address for the resource;
    translating the virtual address for the resource into the physical memory address; and
    storing a translation between the at least one identity parameter and the physical memory address in a network interface table, wherein the network interface table is accessible by a Remote Direct Memory Access (RDA)-enabled network interface of the computer system.

2. The method according to claim 1,
    wherein a remote client accesses the resource using a RDA request containing the at least one identity parameter,
    wherein the translation from the at least one identity parameter to the virtual address and from the virtual address to the physical memory address is performed by a processor of the computer system prior to the remote client accessing the resource, and
    wherein the resource is accessed for the remote client at the physical memory address through the RDA-enabled network interface without intervention from the processor.

3. The method according to claim 1, further comprising:
    computing a unique identifier from the at least one identity parameter; and
    storing a translation between the unique identifier and the physical memory address corresponding to the at least one identity parameter in the network interface table.

4. The method according to claim 2, wherein the resource is a block of data stored on a mass storage device connected to the computer system, further wherein the at least one identity parameter comprises a mass storage device identity and an offset for the block of data on the mass storage device, the translating of the at least one identity parameter into a virtual address extracts data from a mass storage device cache index, the translating of the virtual address into the physical address extracts data from a page table.

5. The method according to claim 1, further comprising:
    processing a Remote Direct Memory Access request at the network interface;
    extracting information corresponding to the at least one identity parameter from the Remote Direct Memory Access request;
    translating the extracted at least one identity parameter into the corresponding physical memory address using the network interface table; and
    accessing the resource at the physical memory through the RDA-enabled network interface.

6. The method according to claim 4, wherein the mass storage device is a hard disk, and the mass storage device cache index is a hard disk cache index.

7. The method according to claim 6, wherein the RDA-enabled network interface comprises translation information referring to data blocks stored outside of a hard disk cache.

8. A network interface table for use in a Remote Direct Memory Access (RDA)-enabled network interface of a computer system, the network interface table comprising at least one identity parameter identifying a mass storage device of the computer system and an offset value for a block of data stored on the mass storage device, the identity parameter being stored in the network interface table together with a physical memory address of the computer system at which the block of data is stored,
    wherein a remote client accesses the mass storage device using a RDA request containing the at least one identity parameter,
    wherein a translation from the at least one identity parameter to a virtual address and from the virtual address to the physical memory address is performed by a processor of the computer system prior to the remote client accessing the mass storage device, and wherein the mass storage device is accessed for the remote client at the physical memory address through the RDA-enabled network interface without intervention from the processor.

9. The network interface table according to claim 8, wherein the mass storage device is a hard disk.

10. The network interface table according to claim 9, wherein the network interface comprises translation information referring to data blocks stored outside of a hard disk cache.

11. A computer system for accessing a resource, the computer system comprising:

a network interface table accessible by a Remote Direct Memory Access (RDA)-enabled network interface;

at least one identity parameter of a resource stored in the network interface table; and a physical memory address at which the resource is stored, wherein a translation between the at least one identity parameter and the physical memory address is stored in the network interface table, and wherein the at least one identity parameter is translated into a virtual address for the resource, and the virtual address for the resource is translated into the physical memory address.

12. The computer system according to claim 11, wherein a remote client accesses the resource using a RDA request containing the at least one identity parameter, wherein the translation from the at least one identity parameter to the virtual address and from the virtual address to the physical memory address is performed by a processor of the computer system prior to the remote client accessing the resource, and wherein the resource is accessed for the remote client at the physical memory address through the RDA-enabled network interface without intervention from the processor.

13. The computer system according to claim 11, wherein the resource is a block of data stored on a mass storage device, further wherein the at least one identity parameter comprises a mass storage device identity and an offset for the block of data on the mass storage device, the translating of the at least one identity parameter into a virtual address extracts data from a mass storage device cache index, the translating of the virtual address into the physical address extracts data from a page table.

14. The computer system according to any one of claims 11, wherein an extracted at least one identity parameter is translated into the corresponding physical memory address using the network interface table, and the resource is accessed at the physical memory through the network interface.

15. The computer system according to claim 13, wherein the mass storage device is a hard disk, and the mass storage device cache index is a hard disk cache index.

16. The computer system according to claim 15, wherein the network interface comprises translation information referring to data blocks stored outside of a hard disk cache.

17. An apparatus for accessing a resource in a computer system, the resource being accessible at a physical memory address of the computer system, the apparatus comprising:

means for determining at least one identity parameter for the resource; and means for storing a translation between the at least one identity parameter and the physical memory address in a network interface table, wherein the network interface table is accessible by a Remote Direct Memory Access (RDA)-enabled network interface of the computer system, wherein a remote client accesses the resource using a RDA request containing the at least one identity parameter, wherein a translation from the at least one identity parameter to a virtual address and from the virtual address to the physical memory address is performed by a processor of the computer system prior to the remote client accessing the resource, and wherein the resource is accessed for the remote client at the physical memory address through the RDA-enabled network interface without intervention from the processor.

* * * * *